(12) United States Patent
Ohno et al.

(10) Patent No.: US 6,351,347 B1
(45) Date of Patent: Feb. 26, 2002

(54) MAGNETIC HEAD

(75) Inventors: Yuki Ohno; Haruo Kurai, both of Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/352,484

(22) Filed: Jul. 13, 1999

(30) Foreign Application Priority Data

| Jul. 21, 1998 | (JP) | 10-204630 |
| Apr. 21, 1999 | (JP) | 11-113027 |

(51) Int. Cl.⁷ ................................................. G11B 5/48
(52) U.S. Cl. ............................................. 360/244.1
(58) Field of Search ............... 360/244.1; 361/684–686

(56) References Cited

U.S. PATENT DOCUMENTS

| 4,645,280 A | * | 2/1987 | Gordon et al. ............... 439/77 |
| 5,631,786 A | | 5/1997 | Erpelding |
| 5,661,896 A | | 9/1997 | Erpelding |
| 5,668,684 A | | 9/1997 | Palmer et al. |
| 5,737,837 A | | 4/1998 | Inaba |
| 5,754,368 A | | 5/1998 | Shiraishi et al. |
| 5,844,753 A | | 12/1998 | Inaba |
| 6,025,988 A | * | 2/2000 | Yan ............................ 361/685 |

* cited by examiner

*Primary Examiner*—George J. Letscher
(74) *Attorney, Agent, or Firm*—Brinks Hofer Gilson & Lione

(57) ABSTRACT

Disclosed is a magnetic head in which the junction portion between a dummy pad and a dummy bump not adapted to transmit electrical signals between a head element and a flexible cable and provided on the lead-out side of the flexible cable, absorbs any distortion due to deflection of the flexible cable.

16 Claims, 4 Drawing Sheets

MAGNETIC HEAD

BACKGROUND OF THE INVENTION

1. Field of the Invention

The present invention relates to a magnetic head and, in particular, to a magnetic head with an improved flexible cable junction structure.

2. Description of the Related Art

The general construction of a magnetic head used in a conventional hard magnetic disk device will be described with reference to FIG. 4. A load beam 21, which consists of a stainless steel plate, comprises a rectangular base portion 21a situated at the rear end thereof, a flat portion 21c connected to the base portion 21a through two elastic portions 21b and extending to the forward end, and a protruding portion 21d outwardly protruding from one side of the base portion 21a and situated in the same plane as the base portion 21a. There is provided on either side of the flat portion 21c a bent portion 21e bent downward. A rectangular mount 23 consisting of a stainless steel plate is superimposed on the portion of the upper surface of the base portion 21a excluding the protruding portion 21d and is fastened thereto by spot welding or the like. Formed at the center of the mount 23 and the base portion 21a, which are superimposed one upon the other, is a through-hole 24 for mounting the magnetic head to a drive arm (not shown) of a hard magnetic disk device.

A flexure 25, which consists of a thin stainless steel plate and which is flexible, comprises a wide portion 25a extending over the central portion of the upper surface of the flat portion 21c of the load beam 21 from the forward end toward the rear end thereof, a narrow portion 25b passing between the two elastic portions 21b of the load beam 21 and extending around the outer periphery of the base portion 21a, and an end portion 25c superimposed on the upper surface of the protruding portion 21d of the load beam 21.

As shown in FIG. 5, a slider 27 consisting of a ceramic and substantially formed as a parallelepiped is fastened to a tongue 25d provided at the forward end of the flexure and partially cut away. On the forward end surface 27a of the slider 27, a thin-film head element 28 for recording and reproducing information on and from a hard magnetic disk and four connection terminals 29 connected to the head element 28 are formed by a thin-film formation technique. Of the four connection terminals 29, two serve to transmit recording signals and the other two serve to transmit reproduction signals.

A ground layer 30 consisting of an insulator such as polyimide is provided around the wide portion 25a and on the narrow portion 25b and the end portion 25c of the flexure 25. Formed on the ground layer 30 are four conductive patterns 31 consisting of nickel- and gold-plated copper.

At the end surface 27a of the slider 27, the forward ends of the four conductive patterns 31 are connected to the connection terminals 29 through balls 32 consisting of a conductive material such as Au. Of the four conductive patterns 31, two are for recording and the other two are for reproduction according to the functions of the connection terminals 29.

As shown in FIG. 6, on the end portion 25c of the flexure 25, the width of the conductive patterns 31 is enlarged such that their end portions are rectangular, forming four rectangular pads 31a, which are arranged in a row from the front side of the flexure 25.

The conductive patterns 31 are covered with an insulating layer (not shown) consisting of polyimide resin or the like. However, the end portions of the conductive patterns 31 connected to the connection terminals 29 of the head element 28 and the portions thereof on the end portion 25c of the flexure 25 are not covered with an insulating layer, the pads 31a being exposed on the end portion 25c.

A flexible cable 33 comprises an insulating substrate 33a consisting of polyimide resin or the like, four conductors 33b formed thereon and consisting of copper or the like, and an insulating covering sheet 33c covering the conductors 33b. The end portions of the conductors 33b are formed as round bumps 33e whose surfaces are solder-plated so as to make it possible to perform soldering connection. The bumps 33e are formed in a row from the front side. From the end portion 33d of the flexible cable 33, which is superimposed on the end portion 25c of the flexure 25, the covering sheet 33c is removed, so that the surfaces of the bumps 33e are exposed.

The bumps 33e and the pads 31a are joined to each other by pressurizing and heating, with the solder-plated surfaces of the bumps 33e and the gold-plated surfaces of the pads 31a being opposed to each other. A round through-hole 34 provided in the protruding portion 21d and a through-hole 35 provided at the end of the flexible cable 33 are used as a means of positioning for the bumps 33e and the pads 31a when they are superimposed one upon the other. The round bumps 33e are included in the rectangular pads 31a.

The flexible cable 33 is led out rearward from the end portion 25c of the flexure 25 and connected to the main body of the hard magnetic disk device, serving to transmit recording and reproduction signals to the thin-film head element 28.

The above magnetic head is mounted to a driving arm of a hard magnetic disk device (not shown) by attaching the mount to the driving arm such that the upper surface 27b of the slider 27 is opposed to the magnetic recording surface of the magnetic disk. During operation, the slider 27 fixed to the flexure 25 flies over the magnetic recording surface of the magnetic disk at a predetermined distance, and magnetic recording and reproduction are performed on and from the magnetic disk by the head element 28, with the airflow being followed due to the flexibility of the flexure 25.

When the flexible cable 33 led out of the conventional magnetic head is deflected during assembly, etc., great distortion occurs to the junction, in particular, between the bumps 33e and the pads 31a which junction is nearest to the lead-out side of the flexible cable 33, causing breakage to the junction, with the result that the exchange of information between the head element 28 and the cable 33 is interrupted.

SUMMARY OF THE INVENTION

The present invention has been made with a view toward solving the above problem. Accordingly, it is an object of the present invention to make it possible to prevent occurrence of distortion to the junctions between the bumps 33e and the pads 31a.

To achieve the above object, there is provided, in accordance with the present invention, a magnetic head comprising a flexure having conductive patterns formed thereon, a flexible cable having conductors, a head element provided at the forward end of the flexure and connected to the conductive patterns, pads provided at the rear end of the flexure and connected to the conductive patterns, a dummy pad provided at the rear end of the flexure and not connected to the conductive patterns, bumps provided at the forward end of the flexible cable and adapted to transmit electric signals between the head element and the flexible cable, a dummy provided at the forward end of the flexible cable and not adapted to transmit electric signals between the head element and the flexible cable, wherein the forward-end portion of the flexible cable is superimposed on the rear-end portion of the flexure to effect junction between the pads and the bumps and between the dummy pad and the dummy bump, the junction between the dummy pad and the dummy bump being positioned nearer to the flexible cable lead-out side than the junctions between the pads and the bumps.

Further, the dummy bump is not connected to the conductors of the flexible cable.

Furthermore, the area of junction between the dummy bump and the dummy pad is larger than the area of junction between each bump and each pad.

Furthermore, the dummy pad and the dummy bump are formed of the same materials as those of the pads and the bumps.

Furthermore, the height of the junction portion between the dummy pad and the dummy bump is the same as that of the junction portions between the pads and the bumps.

DESCRIPTION OF THE PREFERRED EMBODIMENT

Figure 1:
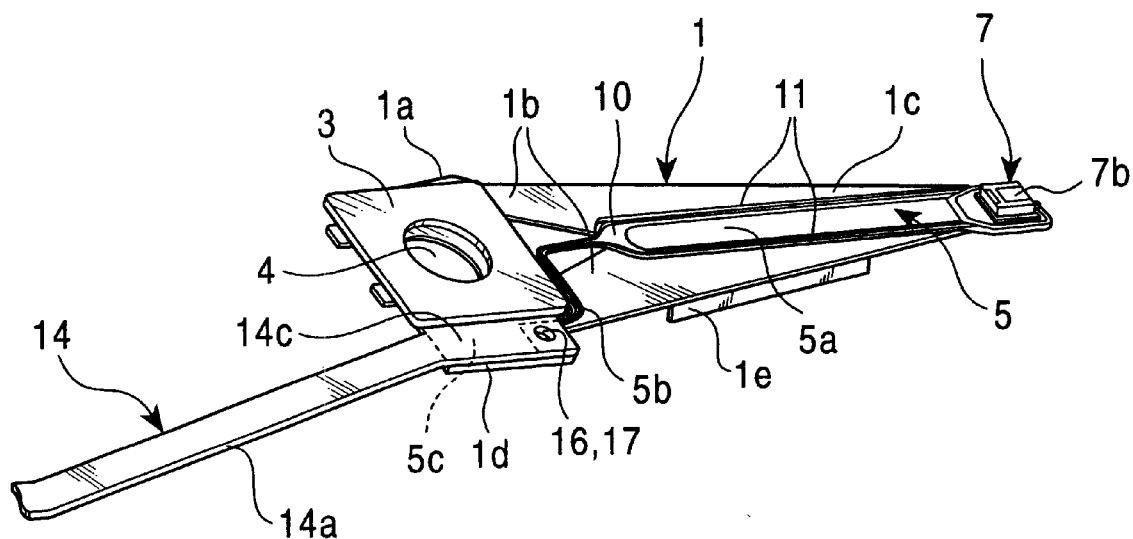
FIG. 1 is a perspective view of a magnetic head according to an embodiment of the present invention.

The general construction of a magnetic head according to the present invention for use in a hard magnetic disk device will be described with reference to FIG. 1. A load beam 1, which consists of a stainless steel plate, comprises a rectangular base portion 1a provided at the rear end, two elastic portions 1b, a flat portion 1c connected to the base portion 1a through the two elastic portions 1b and extending to the forward end, and a protruding portion 1d outwardly protruding from one side of the rectangular base portion 1a and situated in the same plane as the base portion 1a. A bent portion 1e is provided on either side of the flat portion 1c. A rectangular mount 3 consisting of a stainless steel plate is superimposed on the portion of the base portion 1a excluding the protruding portion 1d and is fastened thereto by spot welding or the like. At the center of the mount 3 and the base portion 1a, which are superimposed one upon the other, there is formed a through-hole 4 for mounting the magnetic head to a driving arm (not shown) of the hard magnetic disk device.

A flexure 5 which consists of a thin stainless steel plate and which is flexible comprises a wide portion 5a extending over the central portion of the upper surface of the flat portion 1c from the forward end of the load beam 1 toward the rear end thereof, a narrow portion 5b passing between the two elastic portions 1b of the load beam 1 and extending around the outer periphery of the base portion 1a, and an end portion 5c superimposed on the upper surface of the protruding portion 1d of the load beam 1.

Figure 2:
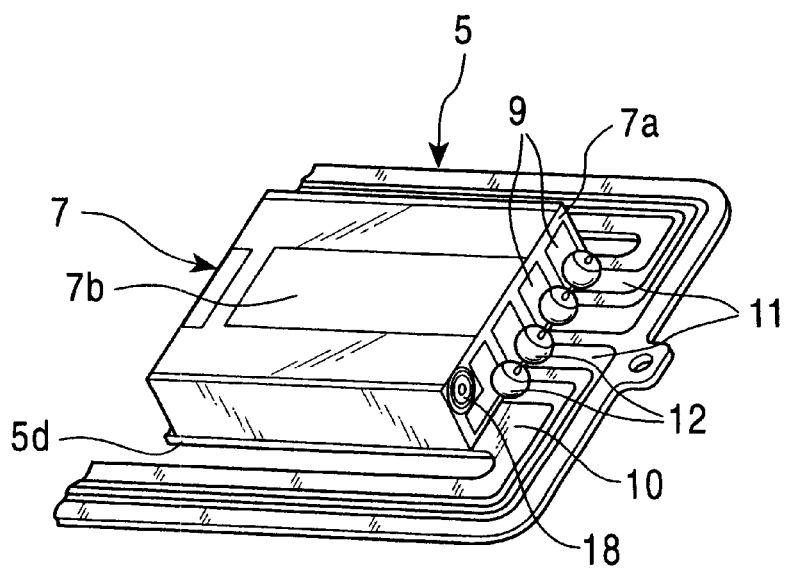
FIG. 2 is an enlarged perspective view of the forward-end portion of a flexure of the magnetic head of the present invention to which a slider is attached.

As shown in FIG. 2, a slider 7 consisting of a ceramic and formed as a parallelepiped is fastened by an adhesive to a tongue 5d provided at the forward end of the flexure 5 and partially cut away. A head element 8 for recording and reproducing information on and from a hard magnetic disk and four connection terminals 9 connected to the head element 8 are formed on the forward-end surface 7a of the slider 7 by a thin-film formation technique. Of the four connection terminals 9, two serve to transmit recording signals and the other two serve to transmit reproduction signals.

A ground layer 10 consisting of an insulator such as polyimide resin is formed in the periphery of the wide portion 5a and on the surface of the narrow portion 5b and the end portion 5c of the flexure 5. Four conductive patterns 11 consisting of gold-plated copper are formed on the ground layer 10.

At the end surface 7a of the slider 7, the forward ends of the four conductive patterns 11 are connected to the connection terminals 9 through balls 12 consisting of a conductive material such as Au. Of the four conductive patterns 11, two are used for recording and the other two are used for reproduction according to the functions of the connection terminals 9 connected thereto, two conductive patterns 11 being led out to either side of the periphery of the flexure 5.

Figure 3:
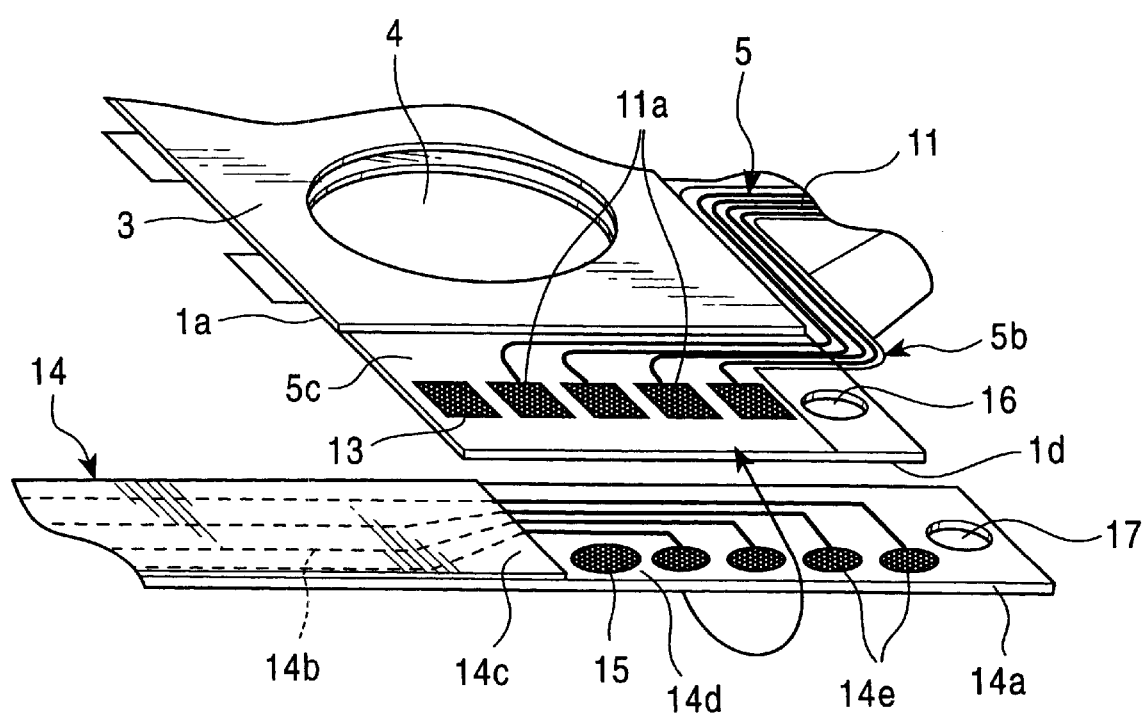
FIG. 3 is a partially exploded perspective view showing the rear-end portion of the flexure and the forward-end portion of the flexible cable of the magnetic head of the present invention.
Figure 4:
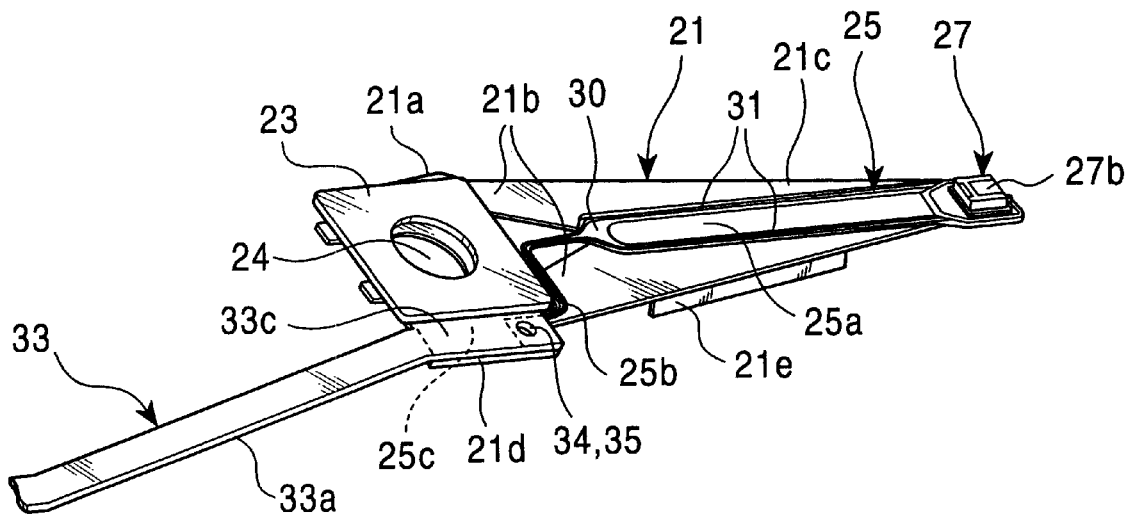
FIG. 4 is a general perspective view of a conventional magnetic head.
Figure 5:
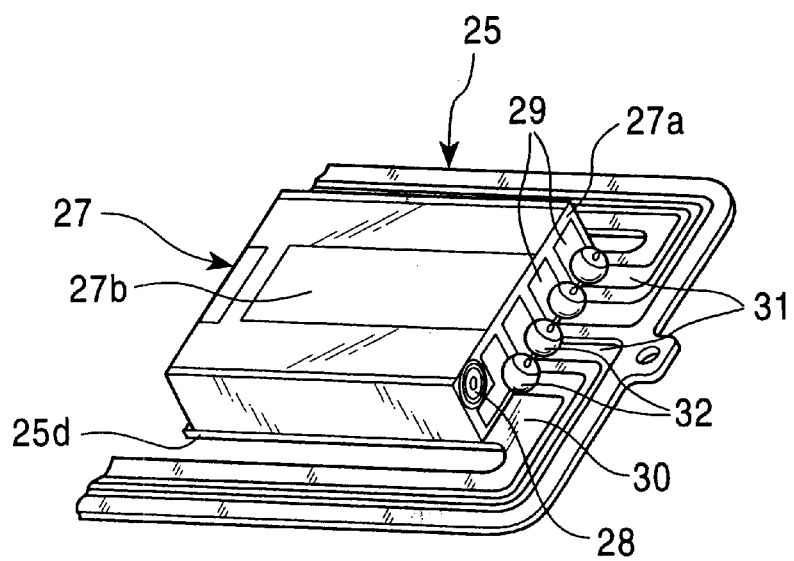
FIG. 5 is an enlarged perspective view of the forward-end portion of a flexure of the conventional magnetic head to which a slider is attached.
Figure 6:
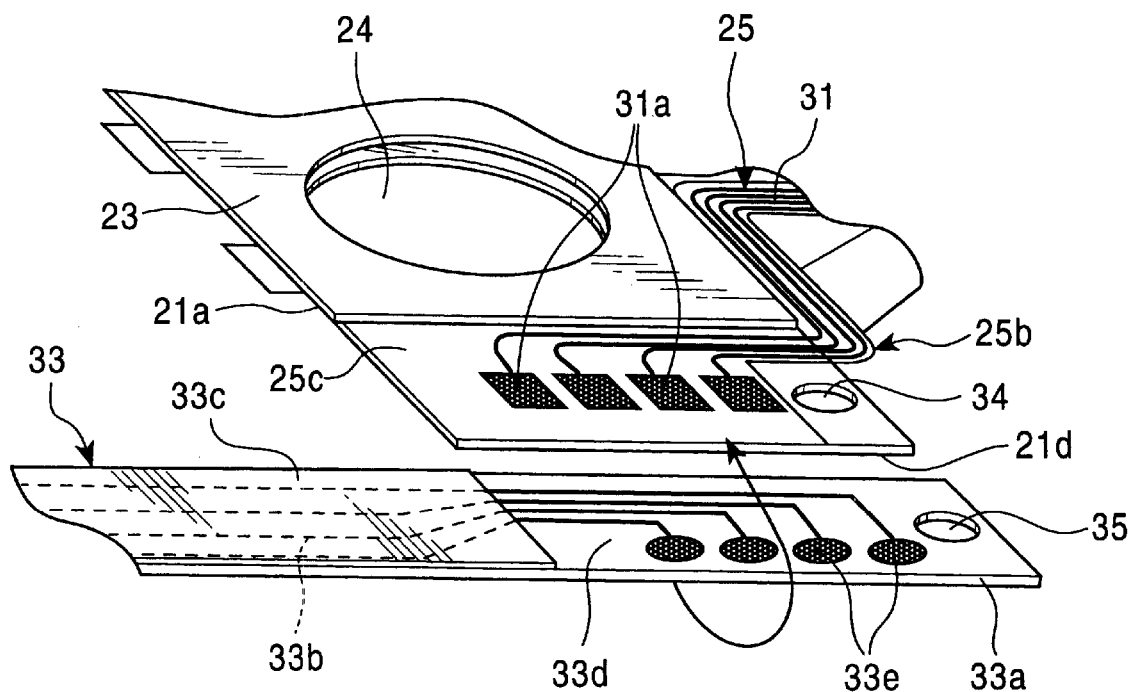
FIG. 6 is a partially exploded perspective view showing the rear-end portion of the flexure and the forward-end portion of the flexible cable of the conventional magnetic head.

As shown in FIG. 3, at the rear-end portion 5c of the flexure 5, the end portions of the four conductive patterns 11 are widened to form four rectangular pads 11a, which are arranged in a row from the front side of the flexure 5. On the rear-end side of the row of pads 11a, there is formed a rectangular dummy pad 13 which consists of nickel- and gold-plated copper and which is not connected to the conductive patterns 11. The height of the dummy pad 13 is the same as that of the pads 11a.

The conductive patterns 11 are covered with a coating film (not shown) consisting of an insulator such as polyimide resin. However, they are not covered with the coating film at the forward-end portion and the rear-end portion 5c of the flexure 5. The portion where the head element 8 is connected to the connection terminals 9, and the surfaces of the pads 11a and the dummy pad 13 are exposed.

A flexible cable 14 comprises a substrate sheet 14a consisting of an insulator such as polyimide, four conductors 14b consisting of copper or nickel formed thereon, and an insulating coating sheet 14c covering the conductors 14b.

The forward-end portions of the conductors 14b are formed as four round bumps 14e whose surfaces are solder-plated so as to enable them to be solder-connected to the pads 11a. The bumps 14e are arranged in a row from the front side of the flexible cable 14.

On the rear-end side of the row of bumps 14e, there is formed a round dummy bump 15 which consists of solder-plated copper or nickel and which is not connected to the conductors 14b. The area of the dummy bump 15 is larger than that of each of the bumps 14e and its height is the same as that of the bumps 14e.

The coating sheet 14c is removed from the forward-end portion 14d of the flexible cable 14, which is superimposed on the rear-end portion 5c of the flexure 5, and the bumps 14e and the dummy bump 15 are exposed at the forward-end portion 14d.

At the rear-end portion 5c of the flexure 5 and the forward-end portion 14d of the flexible cable 14, the pads 11a and the dummy pad 13 are joined to the bumps 14e and the dummy bump 15, respectively, by pressurizing and heating, with the gold-plated surfaces of the pads 11a and the dummy pad 13 being opposed to the solder-plated surfaces of the bumps 14e and the dummy bump 15. A round through-hole 16 provided in the protruding portion 1d and a through-hole 17 provided in the forward-end portion 14d are used as a means of positioning when the bumps 14e and the dummy bump 15 are superimposed on the pads 11a and the dummy pad 13, respectively.

At this time, each round pad 14e only covers the central portion of the associated rectangular pad 11a, whereas the dummy bump 15 covers substantially the entire dummy pad 13.

If the dummy bump 15 is connected to the conductors 14b, no problem is involved as long as exchange of electrical signals is not conducted between it and the head element 8.

It is not absolutely necessary for the area of the dummy bump 15 to be larger than that of each bump 14e. The area of the dummy bump 15 may be the same as or smaller than that of each bump 14e. Further, there is no need for the materials of the dummy pad 13 and the dummy bump 15 to be the same as those of the pads 11a and the bumps 14e. Furthermore, it is not necessary for the height of the dummy pad 13 and the dummy bump 15 to be the same as that of the pads 11a and the bumps 14e. If there is a difference in height, no problem is involved as long as the height of the junction portion between the dummy pad 13 and the dummy bump 15 is the same as the height of the junction portion between each pad 11a and bump 14e.

In the magnetic head of the present invention, the junction portion between the dummy pad 13 and the dummy bump 15, which is on the lead-out side of the flexible cable 14 and which does not transmit or receive electrical signals to or from the head element 8, absorbs any distortion due to deflection of the flexible cable 14, whereby breakage of the junction portions between the pads 11a and the bumps 14e can be prevented, and it is possible to provide a highly reliable magnetic head which is free from interruption of electrical signals.

By making the junction area between the dummy pad 13 and the dummy bump 15 larger than the junction area between each pad 11a and bump 14e, the amount of solder on the surface of the dummy bump 15 is much larger, whereby it is possible to achieve an improvement in junction strength.

When the materials of the dummy pad 13 and the dummy bump 15 are the same as those of the pads 11a and the bumps 14e, it is possible to form the dummy pad 13 and the dummy bump 15 simultaneously with the pads 11a and the bumps 14e, so that it is possible to produce the magnetic head in the same time as in the case of the conventional magnetic head, without involving an increase in the number of production processes.

When the height of the junction portion between the dummy pad 13 and the dummy bump 15 is the same as that of the junction portions between the pads 11a and the bumps 14e, it is possible to prevent the occurrence of distortion between the junction portions of the pads 11a and the bumps 14e.

What is claimed is:

1. A magnetic head comprising a flexure having conductive patterns formed thereon, a flexible cable having conductors, a head element provided at the forward end of the flexure and connected to the conductive patterns, pads provided at the rear end of the flexure and connected to the conductive patterns, a dummy pad provided at the rear end of the flexure and not connected to the conductive patterns, bumps provided at the forward end of the flexible cable and adapted to transmit electric signals between the head element and the flexible cable, a dummy bump provided at the forward end of the flexible cable and not adapted to transmit electric signals between the head element and the flexible cable, wherein the forward-end portion of the flexible cable is superimposed on the rear-end portion of the flexure to effect junction between the pads and the bumps and between the dummy pad and the dummy bump, the junction between the dummy pad and the dummy bump being positioned nearer to the flexible cable lead-out side than the junctions between the pads and the bumps.

2. A magnetic head according to claim 1, wherein the dummy bump is not connected to the conductors of the flexible cable.

3. A magnetic head according to claim 2, wherein the area of junction between the dummy bump and the dummy pad is larger than the area of junction between each bump and each pad.

4. A magnetic head according to claim 3, wherein the dummy pad and the dummy bump are formed of the same materials as those of the pads and the bumps.

5. A magnetic head according to claim 4, wherein the height of the junction portion between the dummy pad and the dummy bump is the same as that of the junction portions between the pads and the bumps.

6. A magnetic head according to claim 3, wherein the height of the junction portion between the dummy pad and the dummy bump is the same as that of the junction portions between the pads and the bumps.

7. A magnetic head according to claim 2, wherein the dummy pad and the dummy bump are formed of the same materials as those of the pads and the bumps.

8. A magnetic head according to claim 7, wherein the height of the junction portion between the dummy pad and the dummy bump is the same as that of the junction portions between the pads and the bumps.

9. A magnetic head according to claim 2, wherein the height of the junction portion between the dummy pad and the dummy bump is the same as that of the junction portions between the pads and the bumps.

10. A magnetic head according to claim 1, wherein the area of junction between the dummy bump and the dummy pad is larger than the area of junction between each bump and each pad.

11. A magnetic head according to claim 10, wherein the dummy pad and the dummy bump are formed of the same materials as those of the pads and the bumps.

12. A magnetic head according to claim 11, wherein the height of the junction portion between the dummy pad and the dummy bump is the same as that of the junction portions between the pads and the bumps.

13. A magnetic head according to claim 10, wherein the height of the junction portion between the dummy pad and the dummy bump is the same as that of the junction portions between the pads and the bumps.

14. A magnetic head according to claim 1, wherein the dummy pad and the dummy bump are formed of the same materials as those of the pads and the bumps.

15. A magnetic head according to claim 14, wherein the height of the junction portion between the dummy pad and the dummy bump is the same as that of the junction portions between the pads and the bumps.

16. A magnetic head according to claim 1, wherein the height of the junction portion between the dummy pad and the dummy bump is the same as that of the junction portions between the pads and the bumps.

* * * * *